US008995441B2

(12) United States Patent
Maezawa

(10) Patent No.: US 8,995,441 B2
(45) Date of Patent: Mar. 31, 2015

(54) COMMUNICATION APPARATUS, COMMUNICATION METHOD, AND NON-TRANSITORY COMPUTER READABLE STORAGE MEDIUM

(75) Inventor: Toshiyuki Maezawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 266 days.

(21) Appl. No.: 13/548,816

(22) Filed: Jul. 13, 2012

(65) Prior Publication Data
US 2013/0215894 A1 Aug. 22, 2013

(30) Foreign Application Priority Data

Feb. 22, 2012 (JP) ................................ 2012-036391

(51) Int. Cl.
H04L 12/28 (2006.01)
H04W 4/00 (2009.01)
H04L 29/06 (2006.01)
H04L 29/12 (2006.01)
(52) U.S. Cl.
CPC ............... *H04L 29/06* (2013.01); *H04L 61/103* (2013.01); *H04L 61/1511* (2013.01); *H04L 61/106* (2013.01); *H04L 61/605* (2013.01); *H04L 61/2015* (2013.01)
USPC ........................... 370/392; 370/332; 370/338
(58) Field of Classification Search
CPC .................................................. H04L 29/0653
USPC ............................................ 370/392, 332, 338
See application file for complete search history.

(56) References Cited

U.S. PATENT DOCUMENTS 7,027,582 B2 * 4/2006 Khello et al. ............ 379/220.01
2001/0026545 A1 * 10/2001 Matsumoto et al. .......... 370/338
2002/0031134 A1 * 3/2002 Poletto et al. ................. 370/401
2009/0010250 A1 * 1/2009 Ganesan et al. .............. 370/352

FOREIGN PATENT DOCUMENTS

JP A-2004-104199 4/2004

* cited by examiner

*Primary Examiner* — Omar Ghowrwal
*Assistant Examiner* — Angel Brockman
(74) *Attorney, Agent, or Firm* — Oliff PLC

(57) ABSTRACT

A communication apparatus includes a retrieval unit that retrieves a first setting information group and a second setting information group respectively from a home gateway apparatus and a DHCP server connected to a communication line, a determining unit that determines whether the setting information related to a predetermined telephone number is included in the first setting information group retrieved by the retrieval unit, an extracting unit that extracts a first type of the setting information related to the predetermined telephone number from the first setting information group, and extracts, from the second setting information group, a second type of the setting information excluding the first type of the setting information, and a communication unit that communicates with a first apparatus and a second apparatus via the communication line using the first type of the setting information and the second type of the setting information extracted by the extracting unit.

23 Claims, 8 Drawing Sheets

FIG. 5

| TYPE OF SETTING INFORMATION | CONTENT OF SETTING INFORMATION |
|---|---|
| IP ADDRESS | 192.168.1.2 |
| SUBNET MASK | 255.255.255.0 |
| TELEPHONE NUMBER | 03-1234-5678 |
| DEFAULT GATEWAY ADDRESS | 192.168.1.254 |
| DNS SERVER ADDRESS | 192.168.1.1 |

FIG. 6

| TYPE OF SETTING INFORMATION | CONTENT OF SETTING INFORMATION |
|---|---|
| IP ADDRESS | 10.0.0.5 |
| SUBNET MASK | 255.255.255.0 |
| DEFAULT GATEWAY ADDRESS | 10.0.0.254 |
| DNS SERVER ADDRESS | 10.0.0.1 |
| WINS SERVER ADDRESS | 10.0.0.2 |

FIG. 8

| TYPE OF SETTING INFORMATION | RETRIEVAL SOURCE |
|---|---|
| IP ADDRESS | HGW APPARATUS |
| SUBNET MASK | HGW APPARATUS |
| TELEPHONE NUMBER | HGW APPARATUS |
| DEFAULT GATEWAY ADDRESS | HGW APPARATUS |
| DNS SERVER ADDRESS | DHCP SERVER |
| WINS SERVER ADDRESS | DHCP SERVER |

FIG. 9

| TYPE OF SETTING INFORMATION | CONTENT OF SETTING INFORMATION |
|---|---|
| IP ADDRESS | 192.168.1.2 |
| SUBNET MASK | 255.255.255.0 |
| TELEPHONE NUMBER | 03-1234-5678 |
| DEFAULT GATEWAY ADDRESS | 192.168.1.254 |
| DNS SERVER ADDRESS | 10.0.0.1 |
| WINS SERVER ADDRESS | 10.0.0.2 |

| TYPE OF SETTING INFORMATION | RETRIEVAL SOURCE |
|---|---|
| IP ADDRESS | DHCP SERVER |
| SUBNET MASK | DHCP SERVER |
| TELEPHONE NUMBER | HGW APPARATUS |
| DEFAULT GATEWAY ADDRESS | DHCP SERVER |
| DNS SERVER ADDRESS | DHCP SERVER |
| WINS SERVER ADDRESS | DHCP SERVER |

FIG. 12

| TYPE OF SETTING INFORMATION | CONTENT OF SETTING INFORMATION |
|---|---|
| IP ADDRESS | 10.0.0.5 |
| SUBNET MASK | 255.255.255.0 |
| TELEPHONE NUMBER | 03-1234-5678 |
| DEFAULT GATEWAY ADDRESS | 10.0.0.254 |
| DNS SERVER ADDRESS | 10.0.0.1 |
| WINS SERVER ADDRESS | 10.0.0.2 |

US 8,995,441 B2

COMMUNICATION APPARATUS, COMMUNICATION METHOD, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2012-036391 filed Feb. 22, 2012.

BACKGROUND (i) Technical Field

The present invention relates to a communication apparatus, a communication method, and a non-transitory computer readable storage medium.

SUMMARY

According to an aspect of the invention, a communication apparatus is provided. The communication apparatus includes a retrieval unit that broadcasts request data requesting setting information via a communication line connected to a home gateway apparatus and a dynamic host configuration protocol (DHCP) server, and retrieves a first setting information group and a second setting information group respectively from the home gateway apparatus and the DHCP server, each having received the request data, the home gateway apparatus providing the first setting information group including a combination of a plurality of types of setting information including an IP address for use in communication with a first apparatus having an image communication function, the DHCP server providing the second setting information group including a combination of a plurality of types of setting information for use in communication with a second apparatus having an image communication function, the second setting information group partially common to the first setting information group in terms of combined types, a determining unit that determines whether the setting information related to a predetermined telephone number is included in the first setting information group retrieved by the retrieval unit, an extracting unit that, if the determining unit has determined that the setting information related to the predetermined telephone number is included in the first setting information group, extracts a first type of the setting information related to the predetermined telephone number from the first setting information group, and extracts, from the second setting information group, a second type of the setting information excluding the first type of the setting information, and a communication unit that communicates with the first apparatus and the second apparatus via the communication line using the first type of the setting information and the second type of the setting information extracted by the extracting unit.

BRIEF DESCRIPTION OF THE DRAWINGS

Exemplary embodiment of the present invention will be described in detail based on the following figures, wherein:

FIG. 5 illustrates an example of setting information provided by a home gateway (HGW) apparatus;

FIG. 6 illustrates an example of the setting information provided by a dynamic host configuration protocol (DHCP) server;

FIG. 8 illustrates an example of a determination table;

FIG. 9 illustrates an example of a setting information group accounted for in the setting process;

FIG. 12 illustrates an example of a table of the setting information group accounted for in the setting process.

DETAILED DESCRIPTION

Figure 1:
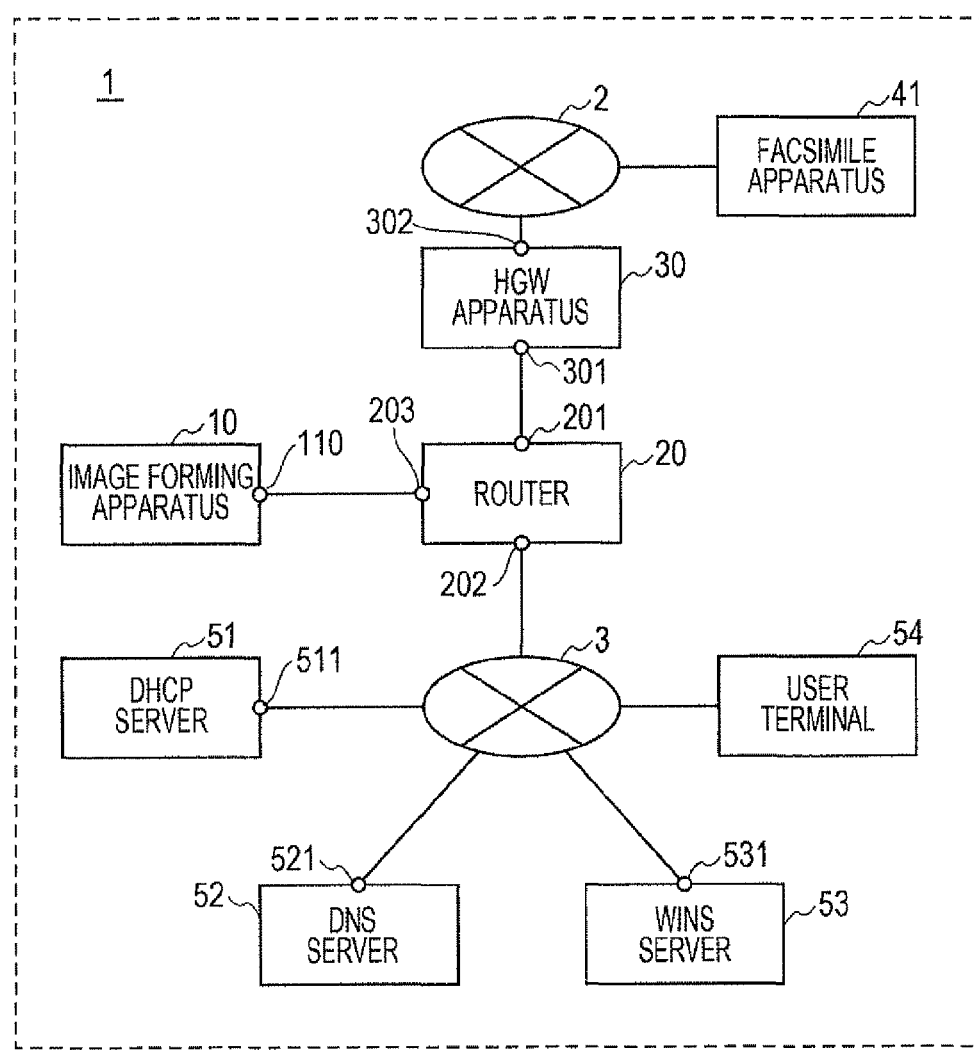
FIG. 1 is a block diagram illustrating a communication system of an exemplary embodiment of the present invention.

FIG. 1 is a block diagram illustrating a configuration of a communication system 1 as an exemplary embodiment of the present invention. The communication system 1 includes public IP line 2, intranet 3, image forming apparatus 10, router 20, home gateway (HGW) apparatus 30, facsimile apparatus 41, DHCP server 51, domain name system (DNS) server 52, Windows Internet name service (WINS) server 53, and user terminal 54. These apparatuses and the terminal are computers having a function of transmitting and receiving data in accordance with transmission control protocol/Internet protocol (TCP/IP) procedure. The data transmitted and received include, as information to control communication, an IP address and a media access control (MAC) address.

The public IP line 2 and the intranet 3 are lines over which communication is performed in accordance with TCP/IP, and are managed as different subnetworks. A private IP address such as 192.168.1.0/24 (192.168.1.0-255) is assigned to the public IP line 2. A private IP address such as 10.0.0.0/24 (10.0.0.0-255) is assigned to the intranet 3. The subnet mask of each of these private IP addresses is "255.255.255.0." The network address of the public IP line 2 is "192.168.1.0" and the network address of the intranet 3 is "10.0.0.0". The public IP line 2 is a next generation network (NGN) and an example of a "first communication line" of the exemplary embodiment of the present invention. The intranet 3 is a local area network (LAN), for example, and an example of a "second communication line" of the exemplary embodiment of the present invention.

The router 20 includes a first communication interface (I/F) 201, a second communication interface 202, and a third communication interface 203, each serving as an interface with another computer. These interfaces are referred to as a network interface card (NIC), and have physical hardware ports ("physical ports"). These interfaces are connected to other apparatuses or communication lines via LAN cables that are to be inserted respectively to the physical ports thereof. More specifically, the router 20 is connected to the HGW apparatus 30 via the first communication interface 201. The router 20 is also connected to the public IP line 2 via the HGW apparatus 30. The router 20 is connected to the intranet 3 via the second communication interface 202. IP addresses "192.168.1.254", and "10.0.0.254" are respectively pre-assigned to the first communication interface 201 and the second communication interface 202. The router 20 is also connected to the image forming apparatus 10 via the third communication interface 203. The IP address, common to the IP address of the first communication interface 201 (i.e., 192.168.1.254), is pre-assigned to the third communication interface 203 by the function of a virtual LAN (VLAN) of the router 20. The subnet mask of the IP address is 255.255.255.0. In other words, the third communication interface 203 is managed by the subnetwork common to the first communication interface 201.

The router 20 performs a routing operation. In the routing operation, the router 20 routes data transmitted from an apparatus connected to a given network (the public IP line 2, for example) to an apparatus connected to another subnetwork (the intranet 3, for example). The router 20 performs the routing operation in accordance with information included in the transmitted data. The information is typically a port number of an IP address of a transmission destination and an IP address of a transmission source. The port number is a logic software port number and is also a number specifying a program of the computer as the transmission destination which receives and processes the transmitted data, from among multiple programs being executed by the computer. For example, if data including a port number 5060 are transmitted, a program supporting session initiation protocol (SIP) communication is specified as a partner to process the data. The router 20 determines an apparatus as a transmission destination in accordance with the information, and routes the data to the apparatus. The router 20 stores data (a routing table and a route map) to determine the apparatus as the transmission destination from the information. The data indicate a setting of routing, and is referred to as "routing setting data" in the discussion that follows.

In the routing setting data, a network address of the transmission destination is associated with an IP address of the apparatus of the route destination. For example, the network address (192.168.1.0) of the public IP line 2 is associated with the IP address of the HGW apparatus 30 because the apparatus as the route destination is the HGW apparatus 30. If the network address of a transmission destination included in the transmitted data is 192.168.1.0, the data are routed to the HGW apparatus 30.

In the routing setting data, the IP address of the transmission source is associated with the apparatus as the route destination, or the port number is associated with the apparatus as the route destination. The router 20 performs the routing operation. In the routing operation, the router 20 routes the transmitted data to the route destination if the routing setting data associates the IP address and the port number of the transmission source included in the transmitted data with the route destination, or discards the data instead of routing the data to anywhere if the routing setting data do not associate the IP address and the port number of the transmission source included in the transmitted data with the route destination.

Data (referred to as an address resolution protocol (ARP) packet) are transmitted in accordance with ARP procedure that allows a MAC address of a destination to be extracted from an IP address of the destination. The router 20 is set up so that the data are not routed to a different subnetwork. The MAC address of the destination is information that is used to transmit the data to the destination. A first computer connected to a given subnetwork (the intranet 3, for example) may attempt to transmit data to a second computer connected to another subnetwork (the public IP line 2, for example). The first computer is unable to retrieve the MAC address of the destination, and unable to include the MAC address in the data to be transmitted. The first computer thus has difficulty in transmitting the data to the destination. If communication is performed across different subnetworks, the router 20 may operate as a default gateway to relay communication information. For example, a computer may directly communicate with the router 20, i.e., may route an ARP packet to the router 20 not via another router. The IP address of the router 20 may be set in the computer as the IP address of the default gateway (a default gateway address). The computer processes the information in accordance with the ARP procedure, thereby retrieving the MAC address of the router 20 from the IP address of the router 20. The computer then transmits to the router 20 data including the retrieved MAC address of the router 20 and the IP address of the destination. The router 20 routes the received data to an apparatus corresponding to the network address indicated by the IP address of the destination.

The DHCP server 51 has a function of supplying to another computer a setting information group in accordance with a dynamic host configuration protocol (DHCP) procedure. A first computer may be connected to a communication line such as the public IP line 2 or the intranet 3. Through this function, the first computer is provided with multiple pieces of information (a setting information group) including the IP address and the subnet mask used in communication with a second computer via the communication line. The DHCP server 51 includes a communication interface 511, and is connected to the intranet 3 via the communication interface 511.

The DNS server 52 determines from a domain name the IP address of the computer identified by the domain name that functions as an identifier identifying the computer (in an operation called domain name resolution). The DNS server 52 includes a communication interface 521, and is connected to the intranet 3 via the communication interface 521. The communication interface 521 is pre-assigned an IP address "10.0.0.1". In a computer like the DNS server 52 having only one communication interface, the IP address assigned to the communication interface is referred to an IP address of the computer.

The WINS server 53 determines from a computer name the IP address of the computer identified by the computer name that functions as an identifier identifying the computer (in an operation called computer name resolution). The WINS server 53 includes a communication interface 531, and is connected to the intranet 3 via the communication interface 531. The communication interface 531 is pre-assigned an IP address "10.0.0.2".

The user terminal 54 may be a computer. The user terminal 54 is a terminal used by a user of the image forming apparatus 10. The user terminal 54 is connected to the intranet 3. The user terminal 54, operated by the user, transmits to the image forming apparatus 10 via the intranet 3, image data representing an image, request data requesting the image data to be transmitted in facsimile communication, and request data requesting the image data to be formed as the image.

The HGW apparatus 30 includes a first communication interface 301 and a second communication interface 302. The HGW apparatus 30 is connected to the router 20 via the first communication interface 301 and is also connected to the public IP line 2 via the first communication interface 302. The first communication interface 301 is assigned an IP address "192.168.1.1". The HGW apparatus 30 is a DHCP server having a DHCP function. The HGW apparatus 30 has also a function as a DNS sever.

The facsimile apparatus 41 has a facsimile function, i.e., an IP facsimile function supporting the SIP communication. The facsimile apparatus 41 is connected to the public IP line 2, and performs facsimile communication with the image forming apparatus 10 via the public IP line 2, the HGW apparatus 30, and the router 20.

The image forming apparatus 10 includes a communication interface 110, and is connected to the third communication interface 203 of the router 20 via the communication interface 110. The image forming apparatus 10 has an image forming function to form an image onto a recording medium such as a paper sheet in accordance with the image data of the image, a scan function to scan an image formed on a recording medium and to generate the image data representing the image, and a facsimile function to transmit or receive image data through facsimile communication. The facsimile communication includes the IP facsimile function supporting the session initiation protocol (SIP) communication. The image forming apparatus 10 performs these functions by communicating with another computer via the router 20, the public IP line 2, and the intranet 3. For example, the image forming apparatus 10 receives the image data and the request data transmitted from the user terminal 54 via the intranet 3, and then performs the image forming function and the facsimile function. The image forming apparatus 10 transmits to the user terminal 54 via the intranet 3 the image data generated through the scan function and the image data received through the facsimile function.

The image forming apparatus 10 retrieves from the DHCP server (such as the HGW apparatus 30 and the DHCP server 51) information for use in the communication described above. The image forming apparatus 10 retains the retrieved information as information indicating the setting of the communication on the image forming apparatus 10, and then references the retained information the image forming apparatus 10 communicates. The information used by the image forming apparatus 10 in communication is hereinafter referred to as "communication setting information."

Figure 2:
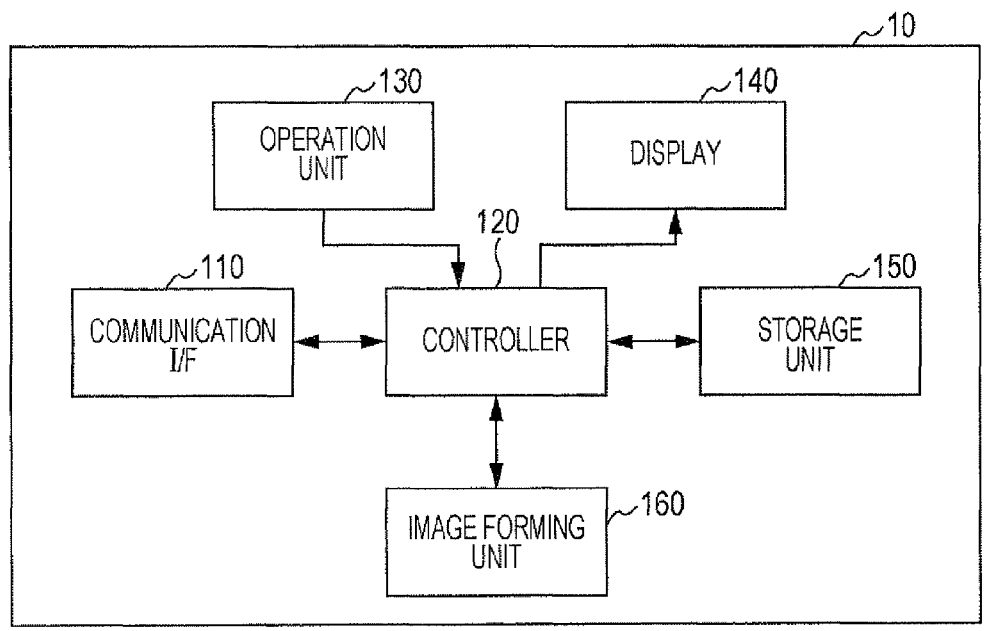
FIG. 2 illustrates a hardware configuration of an image forming apparatus.

FIG. 2 illustrates a hardware configuration of the image forming apparatus 10. The image forming apparatus 10 includes communication interface (I/F) 110, controller 120, operation unit 130, display 140, storage unit 150, and image forming unit 160. The controller 120 includes a processor including a central processing unit (CPU), and a memory. The processor of the controller 120 executes a program stored on the memory, thereby controlling elements of the image forming apparatus 10 and processing data. The controller 120 measures time, acquires a time point at which controlling or processing has been performed, and performing controlling or processing at a specific time point.

The communication interface 110 communicates with a computer, such as the facsimile apparatus 41 and the user terminal 54 via the router 20. For example, the image data and the request data are transmitted from the user terminal 54 to the communication interface 110. The communication interface 110 transfers these pieces of data to the controller 120. When the image data are transmitted to the user terminal 54, the communication interface 110 functions as an output unit to output the image data transmitted from an external apparatus.

The operation unit 130 includes controls such as a button, and supplies the controller 120 with operation information indicating an operation content responsive to a user operation. The display 140 includes a liquid-crystal display screen and a liquid-crystal driving circuit, and displays a progress status of a process and information guiding the user in operating the image forming apparatus 10 in response to information supplied from the controller 120. The storage unit 150 includes a storage device such as a hard disk drive (HDD), and stores the communication setting information and the image data. The image forming unit 160 forms an image on a paper sheet. For example, the image forming unit 160 forms an image electrophotographically using four color toners of yellow (Y), magenta (M), cyan (C), and black (B). The image forming unit 160 forms an image representing the image data on a recording medium (i.e., outputs the image data) when the facsimile function or the image forming function is performed. The age forming unit 160 is an example of an "output unit" in the exemplary embodiment of the invention.

Figure 3:
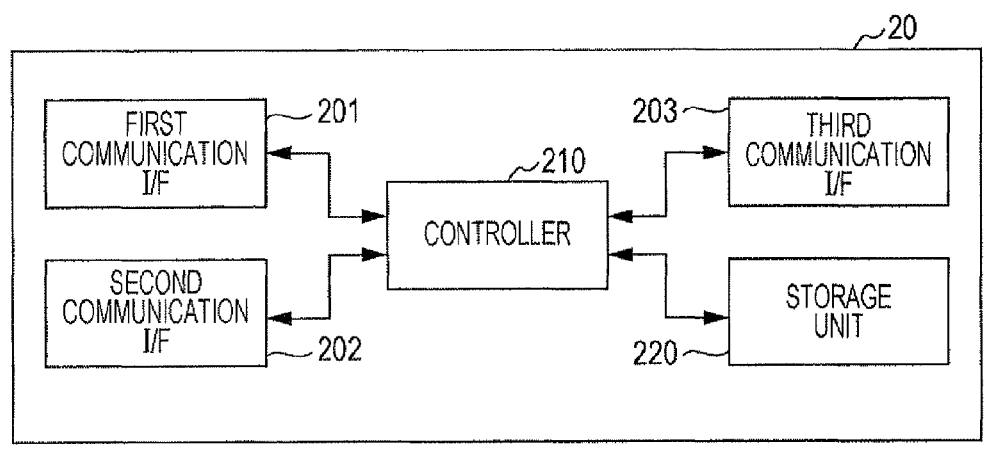
FIG. 3 illustrates a hardware configuration of a router.

FIG. 3 illustrates a hardware configuration of the router 20. The router 20 includes controller 210, first communication interface 201, second communication interface 202, third communication interface 203, and storage unit 220. The controller 210 includes a processor such as a CPU, and a memory such as a read-only memory (ROM) and a random-access memory (RAM). The CPU executes a program stored on the ROM or the storage unit 220 using the RAM as a work area, thereby controlling the elements of the router 20. The first communication interface 201, the second communication interface 202, and the third communication interface 203 are respectively connected to other apparatuses and communication line. The storage unit 220 is a memory such as a storage device. The storage unit 220 stores data and program the controller 210 uses in controlling the router 20. The storage unit 220 also stores the routing setting data.

The image forming apparatus 10 thus constructed provides the user terminal 54 with the image forming function and the facsimile function. The image forming apparatus 10 communicates with the user terminal 54 via the intranet 3 while also communicating with the facsimile apparatus 41 via the HGW apparatus 30 and the public IP line 2. The image forming apparatus 10 provides the user terminal 54 with the image forming function and the facsimile function. To communicate with the user terminal 54 and the facsimile apparatus 41, the image forming apparatus 10 retrieves the setting information group for use in communication from the HGW apparatus 30 and the DHCP server 51, each functioning as a DHCP server. The image forming apparatus 10 performs a setting process to account for the setting information group in the communication setting information of the image forming apparatus 10 and the routing setting data of the router 20. The setting process is described below with reference to FIGS. 4 through 9.

Figure 4:
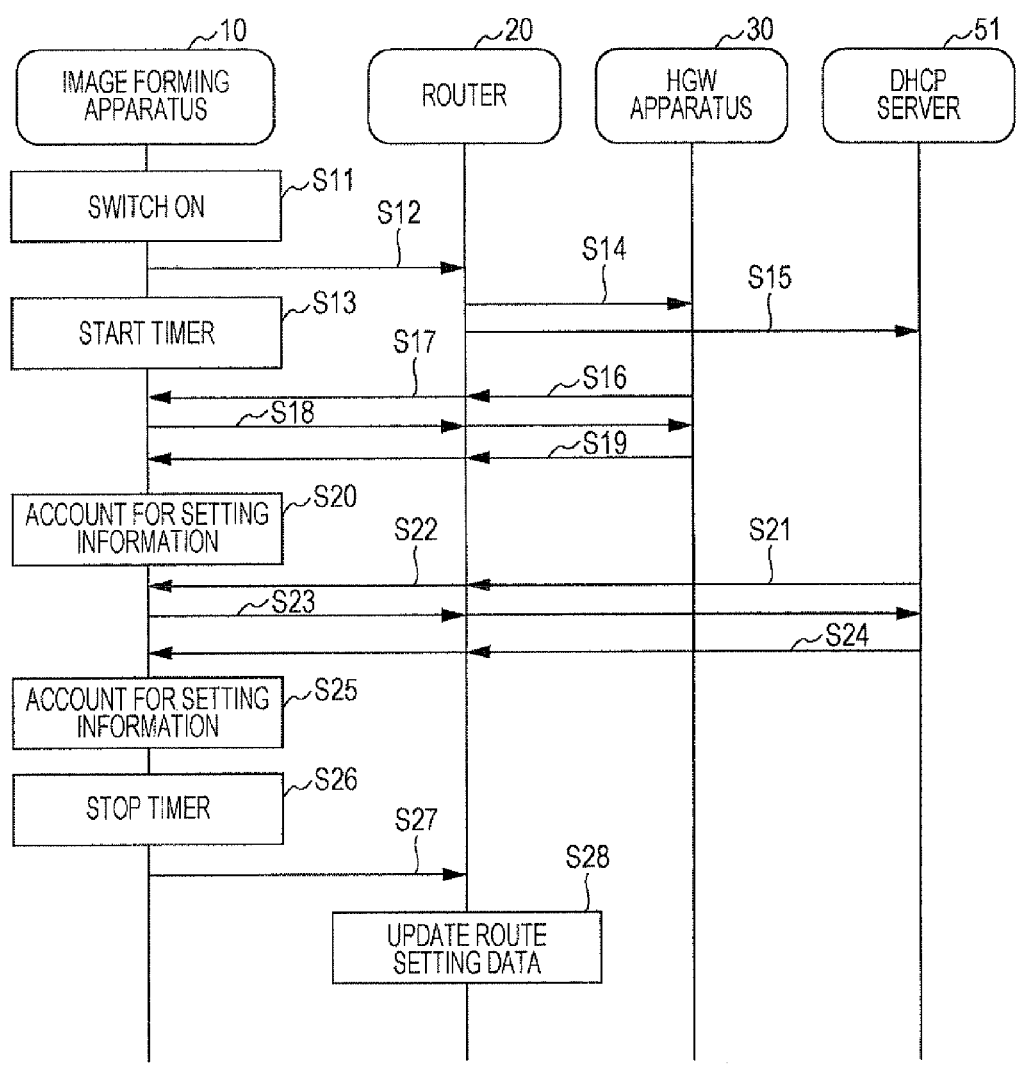
FIG. 4 is a sequence chart illustrating a setting process.

FIG. 4 is a sequence chart illustrating process steps of each apparatus performing in the setting process. The image forming apparatus 10, when switched on, starts the setting process (step S11). The image forming apparatus 10 broadcasts, to an apparatus having a DHCP server function, data referred to as DHCPDISCOVER requesting the setting information group for communication to be supplied (step S12). The data include 67 as a port number of the DHCP server, and 68 as a port number of a DHCP client (i.e., a computer that requests the setting information group and is the image forming apparatus 10 here). Upon completing an operation in step S12, the image forming apparatus 10 starts a timer and waits for a response from the DHCP server 51 (step S13). The timer stops when a predetermined time has elapsed. For example, the timer stops at the elapse of one minute.

The data broadcast from a given subnetwork may include the port number 67 (or 68). The router 20 may store on the storage unit 220 the routing setting data that are set so that the data are broadcast to another subnetwork. More in detail, in accordance with the routing setting data, the data, if broadcast via the third communication interface 203, are not only broadcast via the first communication interface 201 of the same subnetwork but also via the second communication interface 202 of the different subnetwork. The data, if broadcast via the second communication interface 202, are broadcast via the first communication interface 201 and the third communication interface 203 of the different subnetwork.

Since DHCPDISCOVER broadcast in step S21 includes the port number 67 of the destination (or 68 as the port number of the transmission source), the router 20 broadcasts DHCPDISCOVER via the first communication interface 201 and the second communication interface 202 in accordance with the setting of the routing setting data (steps S14 and S15). The image forming apparatus 10 broadcasts DHCPDISCOVER to the public IP line 2 and the intranet 3.

DHCPDISCOVER broadcast in steps S14 and S15 arrives at the HGW apparatus 30 and the DHCP server 51 respectively via the router 20. In the following discussion, DHCPDISCOVER arrives at the HGW apparatus 30 first. Upon receiving DHCPDISCOVER, the HGW apparatus 30 broadcasts data referred to as DHCPOFFER indicating a setting information group (such as an IP address) of a predetermined type to be presented to a request source of the data (step S16). DHCPOFFER broadcast in step S16 arrives at the router 20. In accordance with the routing setting data, the router 20 broadcasts the received DHCPOFFER via the third communication interface 203 (step S17).

DHCPOFFER broadcast by the router 20 in step S17 arrives at the image forming apparatus 10. The image forming apparatus 10 broadcasts data called DHCPREQUEST indicating a formal request for the setting information group indicated by the received DHCPOFFER (step S18). DHCPREQUEST thus broadcast arrives at the HGW apparatus 30 via the router 20. The HGW apparatus 30 receives DHCPREQUEST in step S18. If the HGW apparatus 30 grants the request indicated by DHCPREQUEST (if the presented IP address is not assigned to another computer), the HGW apparatus 30 broadcasts data referred to as DHCPACK indicating the setting information group presented by DHCPOFFER (step S19). DHCPACK thus broadcast arrives at the image forming apparatus 10 via the router 20. The image forming apparatus 10 receives DHCPACK and retrieves the setting information group indicated by DHCPACK in step S19. Using the setting information group, the image forming apparatus 10 executes a process to account for the communication setting information (step S20).

DHCPDISCOVER broadcast by the router 20 in step S15 arrives at the DHCP server 51. Upon receiving DHCPDISCOVER, the DHCP server 51 broadcasts DHCPOFFER indicating the setting information group of a predetermined type (such as an IP address) (step S21). Operations in steps S22 through S24 are similar to operations in steps S17 through S19, respectively. The image forming apparatus 10 receives DHCPACK broadcast by the DHCP server 51 via the router 20 in step S24. The image forming apparatus 10 retrieves the setting information group indicated by DHCPACK. The image forming apparatus 10 executes a process to account for the setting information out of the setting information groups retrieved in the communication setting information of the image forming apparatus 10 (step S25).

Operations in steps S20 and S25 executed by the image forming apparatus 10 are described in detail. The setting information groups supplied by the HGW apparatus 30 and the DHCP server 51 are described with reference to FIGS. 5 and 6.

FIG. 5 illustrates an example of a table listing the setting information group provided by the HGW apparatus 30. The table lists contents of the "type of setting information" on a column of "content of setting information." More specifically, the content of the IP address is "192.168.1.2", the content of "subnet mask" is "255.255.255.0", the content of "telephone number" is "03-1234-5678", the content of "default gateway address" is "192.168.1.254", and the content of "DNS server address" is "192.168.1.1". As illustrated in FIG. 5, the HGW apparatus 30 functions as a first DHCP server that supplies a first setting information group including a combination of multiple types of setting information (five types are listed in the table of FIG. 5).

The HGW apparatus 30 provides, as the setting information to be assigned to the image forming apparatus 10, an unused IP address and telephone number from within a predetermined range of IP addresses and telephone numbers. The telephone number serves as a destination to which image data representing an image are transmitted via the public IP line 2 in facsimile communication, and also serves as a destination when another apparatus transmits image data to the image forming apparatus 10. The HGW apparatus 30 provides the IP addresses of the first communication interface 201 and the third communication interface 203 of the router 20 ("192.168.1.254" in this example) as the "default gateway address" for an IP address of a default gateway, and the IP address of the HGW apparatus 30 ("192.168.1.1" in this example) as the "DNS server address".

FIG. 6 illustrates an example of a table listing the setting information group provided by the DHCP server 51. In the table, the content of "IP address" is "10.0.0.5", the content of "subnet mask" is "255.255.255.0", the content of "default gateway address" is "10.0.0.254", the content of "DNS server address" is "10.0.0.1", and the content of "WINS server address" is "10.0.0.2". As illustrated in FIG. 6, the DHCP server 51 functions as a second DHCP server that provides a second setting information group including a combination of multiple types of setting information (five types listed in the table of FIG. 6). The setting information group of FIG. 6 is common to part of the setting information group of FIG. 5 ("IP address," "subnet mask," "default gateway address," and "DNS server address"). The setting information group of FIG. 6 does not include the "telephone number" but includes the "WINS server address."

As the HGW apparatus 30, the DHCP server 51 provides, as the setting information to be assigned to the image forming apparatus 10, an IP address within a predetermined range of currently unused IP addresses. The DHCP server 51 provides, as the "default gateway address," the IP address of the second communication interface 202 of the router 20 ("10.0.0.254" in this example). The DHCP server 51 also provides, as the "DNS server address," the IP address of the DNS server 52 ("10.0.0.1" in this example), and as the "WINS server address" the IP address of the WINS server 53 ("10.0.0.2" in this example).

The image forming apparatus 10 extracts the setting information of a specific type from the setting information groups illustrated in FIGS. 5 and 6 in steps S20 and S25, and accounts for the extracted setting information in the communication setting information of the image forming apparatus 10. The accounting process is described with reference to FIG. 7.

Figure 7:
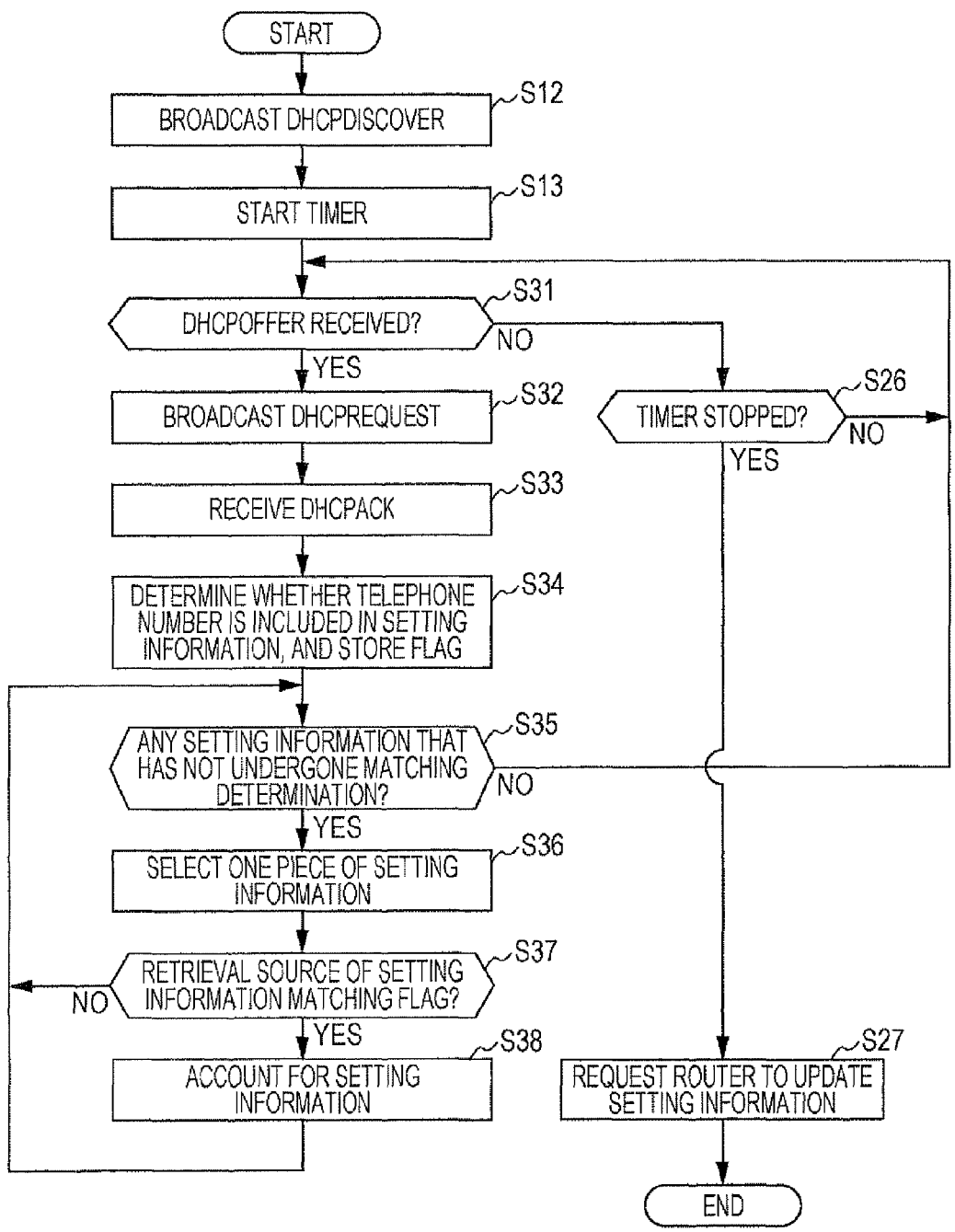
FIG. 7 is a flowchart illustrating a process executed by the image forming apparatus.

FIG. 7 is a flowchart illustrating a setting process of the image forming apparatus 10. The image forming apparatus 10 performs operations in steps S12 and S13 of FIG. 4. The image forming apparatus 10 determines whether DHCPOFFER has been received (step S31). If the image forming apparatus 10 determines that DHCPOFFER has not been received (no from S31), the image forming apparatus 10 then determines whether a timer has stopped (step S26). Upon determining that the timer has not stopped (no from S26), the image forming apparatus 10 performs the operation in step S31 again. In other words, the image forming apparatus 10 repeats operations in steps S31 and S26 until DHCPOFFER has been received or until the timer has stopped.

If DHCPOFFER has been received (yes from S31), the image forming apparatus 10 performs an operation common to steps S18 and S23 of FIG. 4 (i.e., the image forming apparatus 10 broadcasts DHCPREQUEST in step S32). The image forming apparatus 10 then performs an operation common to steps S19 and S24 (i.e., receives DHCPACK in step S33). The image forming apparatus 10 determines whether the setting information group indicated by DHCPACK received in step S19 includes a telephone number as the setting information of a predetermined type (step S34). If the setting information group of FIG. 5 has been received, the image forming apparatus 10 determines that the setting information group includes the telephone number. The image forming apparatus 10 then causes the storage unit 150 to store a retrieval source determination flag indicating that the retrieval source of the setting information group has been an apparatus (the HGW apparatus 30 in this example) providing the setting information of the specific type (the telephone number in this example). If the setting information group of FIG. 6 has been received, the image forming apparatus 10 determines that the setting information group includes no telephone number. The image forming apparatus 10 causes the storage unit 150 to store a retrieval source determination flag indicating that the retrieval source of the setting information group has been an apparatus (the DHCP server 51 in this example) not providing the setting information of the specific type.

The image forming apparatus 10 determines whether the setting information included in the setting information group indicated by DHCPACK received in step S33 matches the setting information of the predetermined type corresponding to the retrieval source indicated by the retrieval source determination flag (this operation is hereinafter referred to as a "matching determination" operation). The image forming apparatus 10 extracts a match in an extraction process. The image forming apparatus 10 performs the extraction process by repeating operations in steps S35 through S38. The image forming apparatus 10 first determines whether the setting information group includes the setting information that has not undergone the matching determination operation (step S35). If the image forming apparatus 10 performs the operation in step S35 for the first time subsequent to step S34, the image forming apparatus 10 has not performed the matching determination operation yet. The image forming apparatus 10 thus determines that the setting information group includes the setting information that has not undergone the matching determination operation (yes from step S35). The image forming apparatus 10 selects one piece of setting information (step S36), and performs the matching determination operation on the selected setting information (step S37). The image forming apparatus 10 causes the storage unit 150 to pre-store a determination table that lists information for use in the matching determination operation.

FIG. 8 illustrates an example of the determination table. The determination table lists a "type of setting information" and a "retrieval source" corresponding to the type of setting information. More specifically, the "IP address," the "subnet mask," the "telephone number" and the "default gateway" are associated with the HGW apparatuses as the retrieval sources. The type of setting information are predetermined as a type of setting information (hereinafter referred to as a "first type") extracted from the setting information group including the telephone number. The determination table associates a type (hereinafter referred to as a "second type") of the remaining setting information excluding the first type with the "DHCP server" as the "retrieval sources" of the "DNS server address," and the "WINS server address."

In step S37, the image forming apparatus 10 references the determination table and determines whether the retrieval source corresponding to the setting information selected in step S36 matches the retrieval source indicated by the flag stored on the storage unit 150 in step S34 (step S35). For example, if the flag indicates the HGW apparatus 30, and if the selected setting information is "IP address" of "192.168.1.2", the determination table associates the "HGW apparatus" with the "IP address." The image forming apparatus 10 thus determines that the two retrieval sources match each other. On the other hand, if the flag indicates the DHCP server 51 or if the selected setting information is the "DNS server address" "10.0.0.1", the image forming apparatus 10 determines that the two retrieval sources fail to match each other.

Upon determining that the two retrieval sources match each other (yes from step S37), the image forming apparatus 10 performs a process to account for the selected setting information in the communication setting information of the image forming apparatus 10 (step S38). The process to account for the setting information refers to a process of the image forming apparatus 10 that stores the setting information in a region of the storage unit 150 that the image forming apparatus 10, when performing communication, references to read the communication setting information. The image forming apparatus 10 accounts for the setting information in the communication setting information, and performs subsequent communication using the communication setting information stored on the region. Upon determining that the two retrieval sources fail to match each other (no from step S37), the image forming apparatus 10 returns to step S35 to perform S35 and subsequent steps without accounting for the setting information in the communication setting information.

The image forming apparatus 10 repeats steps S35 through S37 or through S38 until the setting information not having undergone the matching determination operation becomes non-existent. For example, if the setting information group of FIG. 5 is provided, the image forming apparatus 10 performs the matching determination operation on each of the five types of setting information including the "IP address," the "subnet mask," the "telephone number," the default gateway address," and the "DNS server address." If the setting information not having undergone the matching determination operation becomes non-existent (no from step S35), the image forming apparatus 10 returns to step S31 to perform step S31 and subsequent steps. If the extraction process is performed on the setting information groups of FIGS. 5 and 6 to extract the setting information, the setting information group of FIG. 9 is extracted.

FIG. 9 illustrates an example of a table listing the setting information group accounted for in the communication setting information in the setting process. The table lists in a "content of setting information" column the content of the "type of setting information" accounted for. More specifically, the content of the "IP address" is "192.168.1.2", the content of the "subnet mask" is "255.255.255.0", the content of the "telephone number" is "03-1234-5678", the content of the "default gateway address" is "192.168.1.254", the content of the "DNS server address" is "10.0.0.1", and the content of the "WINS server address" is "10.0.0.2".

The setting information of FIG. 9 is accounted for in the communication setting information. The image forming apparatus 10 references the communication setting information, and then communicates with an apparatus and a terminal connected to the intranet 3 via the router 20 serving as a default gateway. When the image forming apparatus 10 performs communication via the default gateway, the image forming apparatus 10 broadcasts the ARP packet and attempts to retrieve the MAC address from the IP address of the default gateway. The ARP packet does not arrive at the second communication interface 202 without the router 20. The router 20, unless otherwise particularly set up, does not route the ARP packet to another subnetwork. If the IP address of the second communication interface 202 is set as the default gateway address, the image forming apparatus 10 becomes unable to communicate via the default gateway. In accordance with the exemplary embodiment, the IP address of the third communication interface 203 of the router 20 is set as the default gateway address, and the image forming apparatus 10 is free from communication difficulty via the default gateway.

The image forming apparatus 10 executes the name resolution of the DNS server 52 and the WINS server 53 on the apparatus and the terminal connected to the intranet 3. The image forming apparatus 10 thus communicates using identifiers, identifying computers, such as the domain name and the computer name. The default gateway address, the DNS server address, and the WINS server address are accounted for in the communication setting information. When the user terminal 54 of FIG. 1 uses the image forming function, the scan function, or the facsimile function, the image forming apparatus 10 exchanges the image data or the request data with the user terminal 54.

The image forming apparatus 10 performs facsimile communication with the facsimile apparatus 41 via the public IP line 2 using the IP address, the subnet mask, and the telephone number of FIG. 9, and thus exchanges the image data with the facsimile apparatus 41. In this case, the facsimile apparatus 41 transmits the image data, addressed to the telephone number or the IP address, to the image forming apparatus 10.

The setting information group of FIG. 5 (hereinafter referred to as "first setting information group") and the setting information group of FIG. 6 (hereinafter referred to as "second setting information group") commonly share part of a combination of types of setting information (the IP address, the subnet mask, the default gateway address, and the DNS server address). The setting information may be extracted from the setting information group on an opposite side, and the extracted setting information may be accounted for. For example, if the IP address and the subnet mask in the second setting information group are accounted for, the image forming apparatus 10 has difficulty in communicating using the IP address in the facsimile communication. If the default gateway address in the second setting information group is accounted for, the image forming apparatus 10 has difficulty in communicating via the default gateway. In accordance with the exemplary embodiment, the setting information of FIG. 9 is extracted and accounted for, and the image forming apparatus 10 is free from such a communication difficulty. In other words, if the setting information groups commonly sharing part of the combination of types of setting information are retrieved from the two DHCP servers (more specifically the HGW apparatus 30 and the DHCP server 51), the image forming apparatus 10 communicates any of the apparatuses (for example, the facsimile apparatus 41 and the user terminal 54) that remains communicable in accordance with the setting information groups. Through the communication, the user is provided with the functions (including the facsimile function and the image forming function) that are intended to be used by the user.

Upon determining that the timer has stopped (yes from step S26), the image forming apparatus 10 requests the router 20 to update the routing setting data (step S27). More specifically, the image forming apparatus 10 transmits to the router 20 data indicating a request to update and the contents of update to be applied to the routing setting data. The contents of update may include routing to the image forming apparatus 10 data addressed to the IP address of 192.168.1.2 assigned to the image forming apparatus 10, out of data transmitted via the HGW apparatus 30, and not routing but discarding data addressed to any address other than the IP address of 192.168.1.2. Upon receiving the data transmitted in step S27, the router 20 updates the routing setting data as in step S28 in accordance with the content of the data.

Before the updating, if the network address of the transmission destination included in the transmitted data is 192.168.1.0, the router 20 routes the data to the HGW apparatus 30. More specifically, the image data addressed to the IP address (192.168.1.2) of the image forming apparatus 10 and transmitted from the facsimile apparatus 41 to the router 20 may be routed to the HGW apparatus 30. With the updating, the router 20 routes the image data, addressed to the IP address, to the intended address. The facsimile communication addressed to the IP address of the image forming apparatus 10 is performed. The data addressed to another IP address and transmitted to the router 20 are not routed via the third communication interface 203 and the second communication interface 202. In comparison with the case in which the data are routed via the third communication interface 203 and the second communication interface 202, a small amount of data flows through the intranet 3 and a line connecting the image forming apparatus 10 and the third communication interface 203. This arrangement controls a decrease in the communication rate of the line and the intranet 3 caused by the data routed by the router 20.

In accordance with the exemplary embodiment, the image forming apparatus 10 performs the functions described below when the controller 120 executes the program thereof.

Figures 10, 11:
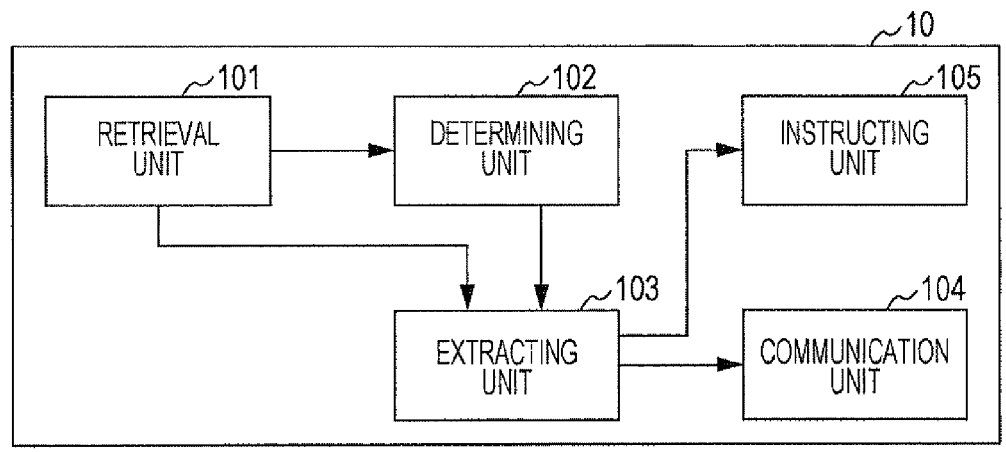
FIG. 10 is a functional block diagram of the image forming apparatus.
FIG. 11 illustrates an example of a determination table of a modification of the exemplary embodiment.

FIG. 10 is a functional block diagram of a function performed by the image forming apparatus 10. The image forming apparatus 10 includes retrieval unit 101, determining unit 102, extracting unit 103, communication unit 104, and instructing unit 105. The retrieval unit 101 performs an operation in step S12 of FIG. 7. In the operation in step S12, the retrieval unit 101 broadcasts DHCPDISCOVER to the HGW apparatus 30 via the public IP line 2, and broadcasts DHCPDISCOVER to the DHCP server 51 via the intranet 3. Each of the public IP line 2 and the intranet 3 is an example of a "communication line" of the exemplary embodiment of the present invention. DHCPDISCOVER is an example of "request data" of the exemplary embodiment of the present invention.

The retrieval unit 101 performs the operations in steps S31, S32, and S33. The retrieval unit 101 retrieves the first and second setting information groups respectively provided by the HGW apparatus 30 and the DHCP server 51, each having received DHCPDISCOVER. The retrieval unit 101 represents a function that is performed when the controller 120 and the communication interface 110 of FIG. 2 operate in concert. The retrieval unit 101 is an example of a "retrieval unit" of the exemplary embodiment of the present invention. The first setting information group is a combination of multiple types of setting information used when the image forming apparatus 10 communicates with the facsimile apparatus 41 (an example of a "first apparatus" of the exemplary embodiment of the present invention). The second setting information group includes part of the setting information group of FIG. 5, such as the IP address and the default gateway address, and is a combination of multiple types of setting information that are used when the image forming apparatus 10 communicates with the user terminal 54 (an example of a "second apparatus" of the exemplary embodiment of the present invention). The retrieval unit 101 supplies the determining unit 102 and the extracting unit 103 with data indicating the retrieved setting information groups.

By performing the operation in step S34 of FIG. 7, the determining unit 102 determines whether the first setting information group retrieved by the retrieval unit 101 includes the setting information of a predetermined type (the telephone number in the example described above). The determining unit 102 represents a function performed by the controller 120, and is an example of a "determining unit" of the exemplary embodiment of the present invention. The determining unit 102 supplies the flag as the determination result to the extracting unit 103 via the storage unit 150. Optionally, the determining unit 102 may supply the flag to the extracting unit 103 not via the storage unit 150 (i.e., without storing the flag on the storage unit 150).

If the determining unit 102 determines that the first setting information group includes the setting information of the predetermined type, the extracting unit 103 repeats the operations in steps S33 through S36 of FIG. 7. The extracting unit 103 thus extracts from the first setting information group the setting information of the type (hereinafter referred to as a "first type") that indicates in FIG. 8 that the "retrieval source" is the "HGW apparatus." As illustrated in FIG. 8, the first type includes the IP address, the subnet mask, the telephone number, and the default gateway address. The extracting unit 103 further extracts the setting information from the second setting information group, excluding the first type of setting information, i.e., extracts two types of setting information of the DNS server address and WINS server address (hereinafter referred to as a "second type"). The extracting unit 103 represents a function performed by the controller 120 and is an example of the "retrieval unit" of the exemplary embodiment of the present invention. The extracting unit 103 supplies data of the extracted setting information of the first type and the second type to the communication unit 104 and the instructing unit 105.

Via the public IP line 2, the communication unit 104 communicates with a computer, such as the facsimile apparatus 41, connected to the public IP line 2. Via the intranet 3, the communication unit 104 also connects with a computer, such as the user terminal 54, connected to the intranet 3. The communication unit 104 is an example of a "communication unit" of the exemplary embodiment of the present invention. In communication with the facsimile apparatus 41, the communication unit 104 uses the SIP communication to exchange data with the facsimile apparatus 41.

The instructing unit 105 performs the operation in step S27 of FIG. 7 to cause the router 20 to update the routing setting data. The instructing unit 105 thus instructs the router 20 to perform an operation in response to the setting information extracted by the extracting unit 103. For example, the instructing unit 105 instructs the router 20 to transmit (route), to the image forming apparatus 10, data addressed to the IP address extracted by the extracting unit 103 and transmitted via the public IP line 2. The instructing unit 105 also instructs the router 20 to discard data addressed to an IP address, other than the IP address extracted by the extracting unit 103, and transmitted via the public IP line 2. The instructing unit 105 represents a function that is performed when the controller 120 and the communication interface 110 operate in concert. The instructing unit 105 is an example of an "instructing unit" of the exemplary embodiment of the present invention.

MODIFICATIONS

The exemplary embodiment has been discussed for exemplary purposes. The exemplary embodiment may be modified in a variety of modifications. The exemplary embodiment and the modifications may be combined as appropriate.

First Modification

The image forming apparatuses of the exemplary embodiment have the image forming function, the scan function, and the facsimile function including an IP facsimile function. The image forming apparatus may have another function (such as a copying function of copying an image formed on a recording medium to another recording medium). Alternatively, the image forming apparatus may not have any one of the functions. The image forming apparatus has desirably at least two functions. One function may be the facsimile function that is provided when the image forming apparatus communicates with a computer connected to the public IP line 2. The other function may be the image forming function or the scan function that is provided when the image forming apparatus communicates with a computer connected to the intranet 3. If the two functions are the facsimile function and the scan function, the image forming apparatus may not include the image forming unit 160. It is sufficient if the image forming apparatus functions as a communication apparatus that performs two different communications described above.

Second Modification

In the operations in steps S35 through S38 of FIG. 7, the image forming apparatus 10 may extract information different from the setting information of the first type and the second type described with reference to the exemplary embodiment. In accordance with the exemplary embodiment, the first type includes the IP address, the subnet mask, the telephone number, and the default gateway address. The second type includes the DNS server address and the WINS server address. Each type may include one of these pieces of information, or a different piece of information other than these pieces of information. For example, if no WINS server is connected to the intranet 3, the second type may not include the WINS server address. If a second DNS server or a second WINS server is connected to the intranet 3, the second type may include a second DNS server address or a second WINS server address. In each case, if the setting information of the first type is accounted for in step S38, the image forming apparatus 10 communicates with a computer (the facsimile apparatus 41, for example) connected to the public IP line 2. If the setting information of the second type is accounted for, the image forming apparatus 10 communicates with a computer (the user terminal 54, for example) connected to the intranet 3. In other words, with the setting information of each type accounted for in the communication setting information, the image forming apparatus 10 performs communication to provide the functions (the image forming function and the facsimile function in the exemplary embodiment).

Third Modification

In the exemplary embodiment, the communication system 1 includes the two communication lines, i.e., the public IP line 2 and the intranet 3. The communication system may include only one communication line. In the communication system 1, the HGW apparatus 30 is connected to the intranet 3. When the image forming apparatus 10 performs the operations in steps S12, S18, and S23 of FIG. 4, the HGW apparatus 30 provides the first setting information group via the intranet 3, and the DHCP server 51 provides the second setting information group. The image forming apparatus 10 accounts for the setting information, respectively extracted from the two setting information groups, in the communication setting information as illustrated in FIG. 9.

If the image forming apparatus performs the process thereof simply in accordance with the DHCP procedure, the setting information group of a first arrived DHCPOFFER may be accounted for, and none of the subsequent setting information groups may be accounted for. In accordance with the third modification, the two DHCP servers respectively providing the first and second setting information groups are connected to the common communication line, and the image forming apparatus 10 extracts from each of the setting information groups the setting information of the types illustrated in FIG. 8, and then accounts for the setting information in the communication setting information as illustrated in FIG. 9. It is sufficient if the communication system simply includes two DHCP servers, such as the HGW apparatus 30 and the DHCP server 51. The two DHCP servers provide the setting information groups to different apparatuses (the facsimile apparatus 41 and the user terminal 54 herein) that use the setting information groups for communication, and the setting information groups commonly share part of the combinations of types of setting information.

Fourth Modification

In accordance with the exemplary embodiment, the communication system 1 includes the two DHCP servers, i.e., the HGW apparatus 30 and the DHCP server 51. Optionally, the communication system 1 may include three or more DHCP servers. For example, two DHCP servers may be connected to the intranet 3. The two DHCP servers may provide the second setting information group. If the second setting information group is provided by the two DHCP servers before the timer stops, the image forming apparatus 10 overwrites the setting information extracted from the second setting information group provided earlier with the setting information extracted from the second setting information group provided later. Optionally, the image forming apparatus 10 may discard the setting information extracted later. Alternatively, the image forming apparatus 10 may determines whether the type of the setting information included in the second setting information group provided later is common to the type of the setting information included in the second setting information group provided earlier, and if the two types are common, the image forming apparatus 10 does not extract the setting information from the second setting information provided later.

If the three DHCP apparatuses provide setting information groups different from each other in the fourth modification, the image forming apparatus 10 operates as described below. The three DHCP apparatuses may be the HGW apparatus 30, the DHCP server 51, and a third DHCP server. The third DHCP server may provide a third setting information group including the second setting information group and a second DNS server address. The storage unit 150 adds the second DNS server address as the "type of setting information" to the determination table of FIG. 8 and stores association of the "retrieval source" of the type of the setting information with the third DHCP server. In the process of FIG. 7, the image forming apparatus 10 extracts the setting information of the second DNS server address from the third setting information group. In this way, the setting information respectively extracted from the setting information groups provided by the three DHCP servers is accounted for in the communication setting information. If the setting information for use in communication provided by only one DHCP server is not sufficient, the image forming apparatus 10 retrieves the setting information groups respectively from multiple DHCP servers providing the setting information, and extracts from the setting information groups the setting information for use in communication.

Fifth Modification

The content of the instruction in step S22 of FIG. 4 provided by the image forming apparatus 10 (more specifically the instructing unit 105) is not limited to the content of the instruction described previously. The instruction may include the port number in addition to the IP address of the destination of the computer serving as a transmission destination of data. For example, if the data addressed to an external apparatus connected to the public IP line 2 and transmitted from the image forming apparatus 10 to the router 20 include a port number 5060 for use in the SIP communication, the image forming apparatus 10 instructs the router 20 to route the data to the external apparatus. If the data include a port number other than the port number 5060, the image forming apparatus 10 instructs the router 20 not to route the data to the external apparatus. Data that are not to be transmitted to an apparatus connected to the public IP line 2, such as the image data used through the image forming function, may be transmitted by a harmful program or an erratic user operation. In such a case, the data are not transmitted to the public IP line 2 as long as the port number other than the port number 5060 is specified. In comparison with the case in which data are routed to both sides regardless of the port number, the communication system reliably controls data leakage from the intranet 3 to the public IP line 2.

If data addressed to the image forming apparatus 10 and transmitted to the router 20 from the external apparatus include the port number 5060, the image forming apparatus 10 instructs the router 20 to route the data to the image forming apparatus 10. If the data include another port number, the image forming apparatus 10 instructs the router 20 not to route the data to the image forming apparatus 10. In comparison with the arrangement in which data are routed to both sides regardless of the port number, the communication system of the fifth modification controls the arrival of data possibly containing a computer virus from the public IP line 2 at the image forming apparatus 10. In comparison with the arrangement in which data are routed to both sides regardless of the port number, the communication system of the fifth modification controls a decrease in the communication speed of the image forming apparatus 10 and the router 20 caused by the data addressed to the image forming apparatus 10 from the external apparatus.

The image forming apparatus 10 may instruct the router 20 to route to the intranet 3 data transmitted from the public IP line 2 to the router 20 to be broadcast and multicast to the intranet 3. The image forming apparatus 10 may instruct the router 20 to route to the public IP line 2 data transmitted from the intranet 3 to the router 20 to be broadcast and multicast to the public IP line 2.

Sixth Modification

In the exemplary embodiment, the router 20 routes DHCP-DISCOVER and DHCPREQUEST broadcast in steps S12 and S18 of FIG. 4 toward the HGW apparatus 30 and the DHCP server 51 in accordance with the setting indicated by the routing setting data. These operations may be performed using a program called a DHCP relay agent. The DHCP relay agent performs a function of routing these pieces of broadcast data to another subnetwork. The router 20 pre-stores the IP addresses of the HGW apparatus 30 and the DHCP server 51. Upon receiving DHCPDISCOVER and DHCPREQUEST, the router 20 routes DHCPDISCOVER and DHCPREQUEST to the respective stored IP addresses. The operations in steps S14 through S19 and the operations in steps S21 through S24 of FIG. 4 are thus performed. The image forming apparatus 10 retrieves the setting information groups from the HGW apparatus 30 and the DHCP server 51.

Seventh Modification

The HGW apparatus 30 and the DHCP server 51 may provide the setting information groups in accordance with a procedure other than the DHCP procedure. The HGW apparatus 30 and the DHCP server 51 may provide the setting information groups in accordance with the ARP procedure or bootstrap protocol (BOOTP) procedure. It is sufficient if the HGW apparatus 30 and the DHCP server 51 function as a setting information providing apparatus that provides the image forming apparatus 10 with the setting information group for use in communication with the facsimile apparatus 41, the DNS server 52, the WINS server 53, and the user terminal 54 illustrated in FIG. 1. The HGW apparatus 30 is an example of a "first setting information providing apparatus" of the exemplary embodiment of the present invention. The DHCP server 51 is an example of a "second setting information providing apparatus" of the exemplary embodiment of the present invention.

Eighth Modification

In accordance with the exemplary embodiment, the IP address (192.168.1.254) pre-assigned to the first communication interface 201 is also pre-assigned to the third communication interface 203 of the router 20. Alternatively, the IP address (10.0.0.254 with the subnet mask 255.255.255.0) pre-assigned to the second communication interface 202 may also be pre-assigned to the third communication interface 203. In this case, the third communication interface 203 is managed by the subnetwork different from the subnetwork of the first communication interface 201. The image forming apparatus 10 extracts the setting information using a determination table different from the determination table of FIG. 8.

FIG. 11 illustrates an example of a determination table of the eighth modification. In the determination table of FIG. 8, the "retrieval sources" of the "IP address," the "subnet mask," and the "default gateway address" are the "DHCP server" instead of the "HGW apparatus."

FIG. 12 is a table listing an example of the setting information group that is accounted for when the image forming apparatus 10 uses the determination table of FIG. 11. As listed in the table, the image forming apparatus 10 accounts for "10.0.0.5" and "255.255.255.0" of FIG. 6 in the "IP address" and the "subnet mask" of the communication setting information, respectively. The image forming apparatus 10 accounts for the IP address "10.0.0.254", i.e., the IP address of the third communication interface 203 in the "default gateway address" of the communication setting information. As described above, the third communication interface 203 and the first communication interface 201 are different in subnetwork. If the IP address of the first communication interface 201 provided by the HGW apparatus 30 as the default gateway address is accounted for, an ARP packet broadcast by the image forming apparatus 10 fails to arrive at the default gateway address. The image forming apparatus 10 has difficulty in communicating via the default gateway. In accordance with the eighth modification, the setting information is extracted, and the image forming apparatus 10 performs communication via the default gateway.

In step S27 of FIG. 4, the image forming apparatus 10 requests the routing setting data to be updated in accordance with the operation content described below. The operation content is that, out of data transmitted to the router 20 via the public IP line 2 (i.e., via the HGW apparatus 30), data having as a destination the IP address "192.168.1.2" included in the setting information group of FIG. 5 retrieved from the HGW apparatus 30 are routed to the IF address 10.0.0.5 assigned to the image forming apparatus 10 (i.e., routed to the image forming apparatus 10). Data having as a destination an IP address other than the IP address 192.168.1.2 are not routed to any destination but are simply discarded. Updating is performed in accordance with this operation content. The router 20 routes the image data transmitted thereto and addressed to the IP address 192.168.1.2 to the image forming apparatus 10. The facsimile communication having the IP address as a destination is performed. On the other hand, data transmitted the router 20 and addressed to another IP address are not routed. As previously described with referent to the exemplary embodiment, the eighth modification controls a decrease in the communication speed of communication performed over the intranet 3 and the line connecting the image forming apparatus 10 and the third communication interface 203.

Ninth Modification

The present invention may be understood as the image forming apparatus 10, the communication system 1 including the image forming apparatus 10, a communication apparatus communicating in accordance with TCP/IP (the image forming apparatus 10 is one example of the communication apparatus), a controller as a computer controlling one of the communication apparatus and the image forming apparatus 10, and a program that causes the controller to perform the process of FIG. 7. The program may be supplied in the form of a recording medium, such as an optical disk, having the program recorded thereon. The program may also supplied by downloading the program onto the computer via a communication line such as the Internet, and installing the program onto the computer for use.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
    a storage unit that pre-stores a determination table that lists types of setting information and pre-stored retrieval sources respectively corresponding to the types of setting information;
    a retrieval unit that retrieves a first setting information group from a first setting information providing apparatus (30) and a second setting information group from a second setting information providing apparatus (51) via a communication line, wherein the first setting information providing apparatus provides a first setting information group including a combination of a plurality of types of setting information including an IP address for use in communication with a first apparatus (41) connected to first network, wherein the second setting information providing apparatus provides a second setting information group including a combination of a plurality of types of setting information in communication with a second apparatus (54) connected to second network; and a communication unit that communicates with the first apparatus using a first type of the setting information which is extracted from the first setting information group when specific type of information is included in the first setting information group, wherein the communication unit communicates with the second apparatus using second type of the setting information which is extracted from the second setting information group, the second setting information group includes a type other than the first type of the setting information, and wherein an image forming apparatus references the determination table to determine whether a retrieval source corresponding to selected setting information, that is selected from at least one of the first setting information group or second setting information group, matches at least one retrieval source of the pre-stored retrieval sources, where the at least one retrieval source is indicated by a flag stored on the storage unit.

2. The communication apparatus according to claim 1, wherein the communication unit extracts from the first setting information group the first type of the setting information including a predetermined telephone number, wherein the communication unit receives image data addressed to and transmitted to the predetermined telephone number which is extracted from the first setting information group, and wherein the communication apparatus comprises an output unit that outputs the image data received by the communication unit.

3. The communication apparatus according to claim 1, wherein the communication line comprises a first communication line and a second communication line, the first communication line connected to the gateway apparatus and connected to a router via the gateway apparatus, the second communication line connected to the second setting information providing apparatus and the router;

wherein the retrieval unit transmits the request data to the first communication line and the second communication line via the router; and wherein the communication unit extracts from the second setting information group an Internet protocol (IP) address of a default gateway as the second type of the setting information.

4. The communication apparatus according to claim 2, wherein the communication line comprises a first communication line and a second communication line, the first communication line connected to the gateway apparatus and connected to a router via the gateway apparatus, the second communication line connected to the second setting information providing apparatus and the router;

wherein the retrieval unit transmits the request data to the first communication line and the second communication line via the router; and wherein the communication unit extracts from the second setting information group an Internet protocol (IP) address of a default gateway as the second type of the setting information.

5. The communication apparatus according to claim 3, wherein the communication unit extracts from the second setting information group as the second type of the setting information an IP address of an apparatus that identifies an IP address of the second apparatus from an identifier identifying the second apparatus.

6. The communication apparatus according to claim 4, wherein the communication unit extracts from the second setting information group as the second type of the setting information an IP address of an apparatus that identifies an IP address of the second apparatus from an identifier identifying the second apparatus.

7. The communication apparatus according to claim 3, wherein the first setting information group includes an IP address to be assigned to the communication apparatus, and wherein the communication apparatus comprises an instructing unit that instructs the router to transmit, to the communication apparatus, data that are addressed to the IP address included in the first setting information group retrieved by the retrieval unit and are transmitted to the router via the first communication line.

8. The communication apparatus according to claim 4, wherein the first setting information group includes an IP address to be assigned to the communication apparatus, and wherein the communication apparatus comprises an instructing unit that instructs the router to transmit, to the communication apparatus, data that are addressed to the IP address included in the first setting information group retrieved by the retrieval unit and are transmitted to the router via the first communication line.

9. The communication apparatus according to claim 5, wherein the first setting information group includes an IP address to be assigned to the communication apparatus, and wherein the communication apparatus comprises an instructing unit that instructs the router to transmit, to the communication apparatus, data that are addressed to the IP address included in the first setting information group retrieved by the retrieval unit and are transmitted to the router via the first communication line.

10. The communication apparatus according to claim 6, wherein the first setting information group includes an IP address to be assigned to the communication apparatus, and wherein the communication apparatus comprises an instructing unit that instructs the router to transmit, to the communication apparatus, data that are addressed to the IP address included in the first setting information group retrieved by the retrieval unit and are transmitted to the router via the first communication line.

11. The communication apparatus according to claim 7, wherein the instructing unit instructs the router to discard data that are addressed to an IP address other than the IP address to be assigned to the communication apparatus included in the first setting information group retrieved by the retrieval unit and are transmitted to the router via the first communication line.

12. The communication apparatus according to claim 8, wherein the instructing unit instructs the router to discard data that are addressed to an IP address other than the IP address to be assigned to the communication apparatus included in the first setting information group retrieved by the retrieval unit and are transmitted to the router via the first communication line.

13. The communication apparatus according to claim 9, wherein the instructing unit instructs the router to discard data that are addressed to an IP address other than the IP address to be assigned to the communication apparatus included in the first setting information group retrieved by the retrieval unit and are transmitted to the router via the first communication line.

14. The communication apparatus according to claim 10, wherein the instructing unit instructs the router to discard data that are addressed to an IP address other than the IP address to be assigned to the communication apparatus included in the first setting information group retrieved by the retrieval unit and are transmitted to the router via the first communication line.

15. The communication apparatus according to claim 3, wherein the communication unit transmits data in session initiation protocol (SIP) communication, and
wherein the communication apparatus comprises an instructing unit that, if data transmitted from the communication apparatus to the first apparatus include a first port number to be used in the SIP communication, instructs the router to route the data to the first apparatus, and if the data transmitted to the first apparatus include a port number other than the first port number, instructs the router not to route the data to the first apparatus.

16. The communication apparatus according to claim 5, wherein the communication unit transmits data in session initiation protocol (SIP) communication, and
wherein the communication apparatus comprises an instructing unit that, if data transmitted from the communication apparatus to the first apparatus include a first port number to be used in the SIP communication, instructs the router to route the data to the first apparatus, and if the data transmitted to the first apparatus include a port number other than the first port number, instructs the router not to route the data to the first apparatus.

17. The communication apparatus according to claim 3, wherein the communication unit transmits data in session initiation protocol (SIP) communication, and
wherein the communication apparatus comprises an instructing unit that, if data transmitted from the first apparatus to the communication apparatus specify a first port number to be used in the SIP communication, instructs the router to route the data to the communication apparatus, and if the data transmitted to the communication apparatus specify a port number other than the first port number, instructs the router not to route the data to the communication apparatus.

18. The communication apparatus according to claim 5, wherein the communication unit transmits data in session initiation protocol (SIP) communication, and
wherein the communication apparatus comprises an instructing unit that, if data transmitted from the first apparatus to the communication apparatus specify a first port number to be used in the SIP communication, instructs the router to route the data to the communication apparatus, and if the data transmitted to the communication apparatus specify a port number other than the first port number, instructs the router not to route the data to the communication apparatus.

19. A communication method comprising:
pre-storing a determination table that lists types of setting information and pre-stored retrieval sources respectively corresponding to the types of setting information;
retrieving a first setting information group from a first setting information providing apparatus and a second setting information group from a second setting information providing apparatus via a communication line, wherein the first setting information providing apparatus provides a first setting information group including a combination of a plurality of types of setting information including an IP address for use in communication with a first apparatus connected to first network, wherein the second setting information providing apparatus provides a second setting information group including a combination of a plurality of types of setting information in communication with a second apparatus connected to second network;
communicating with the first apparatus using a first type of the setting information which is extracted from the first setting information group when specific type of information is included in the first setting information group;
communicating with the second apparatus using second type of the setting information which is extracted from the second setting information group, the second setting information group includes a type other than the first type of the setting information; and
referencing the determination table to determine whether a retrieval source corresponding to selected setting information, that is selected from at least one of the first setting information group or second setting information group, matches at least one retrieval source of the pre-stored retrieval sources, where the at least one retrieval source is indicated by a stored flag.

20. A non-transitory computer readable medium storing a program causing a computer to execute a process for communication, the process comprising:
retrieving a first setting information group from a first setting information providing apparatus and a second setting information group from a second setting information providing apparatus via a communication line, wherein the first setting information providing apparatus provides a first setting information group including a combination of a plurality of types of setting information for use in communication with a first apparatus connected to first network, wherein the second setting information providing apparatus provides a second setting information group including a combination of a plurality of types of setting information in communication with a second apparatus connected to second network;
communicating with the first apparatus using a first type of the setting information which is extracted from the first setting information group when specific type of information is included in the first setting information group;
communicating with the second apparatus using second type of the setting information which is extracted from the second setting information group, the second setting information group includes a type other than the first type of the setting information; and
referencing the determination table to determine whether a retrieval source corresponding to selected setting information, that is selected from at least one of the first setting information group or second setting information group, matches at least one retrieval source of the pre-stored retrieval sources, where the at least one retrieval source is indicated by a stored flag.

21. The communication apparatus according to claim 1, wherein the specific type of information that is included in the first setting information group is a telephone number.

22. The communication apparatus according to claim 1, wherein when the second setting information group includes types which are not predetermined and which are partly common with types included in the first setting information group, and wherein the types of the second setting information group are not used for communication setting for the first apparatus.

23. The communication apparatus according to claim 2, wherein the first setting information group includes at least setting information regarding an IP facsimile function supporting session initiation protocol (SIP) communication.

* * * * *